(12) United States Patent
Valet et al.

(10) Patent No.: US 6,304,522 B1
(45) Date of Patent: Oct. 16, 2001

(54) DATA MEDIUM OPTICAL RECORDING/READING DEVICE

(75) Inventors: Thierry Valet, Viroflay; Olivier Fallou, Paris, both of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/600,859

(22) PCT Filed: Jan. 26, 1999

(86) PCT No.: PCT/FR99/00150

§ 371 Date: Jul. 27, 2000

§ 102(e) Date: Jul. 27, 2000

(87) PCT Pub. No.: WO99/38160

PCT Pub. Date: Jul. 29, 1999

(30) Foreign Application Priority Data

Jan. 27, 1998 (FR) .................................. 98 00852

(51) Int. Cl.$^7$ ...................................... G11B 11/00
(52) U.S. Cl. ...................... 369/13; 369/275.1; 369/44.12
(58) Field of Search ........................ 369/13–14, 275.3, 369/275.1, 116, 121, 44.23, 44.12, 44.14, 112.01, 112.27, 126; 250/216

(56) References Cited

U.S. PATENT DOCUMENTS

| | | |
|---|---|---|
| 5,251,088 | 10/1993 | Coutellier et al. . |
| 5,282,104 | 1/1994 | Coutellier et al. . |
| 5,306,573 | 4/1994 | Pirot et al. . |
| 5,335,120 | 8/1994 | Colineau et al. . |
| 5,463,516 | 10/1995 | Valet et al. . |
| 5,696,447 | 12/1997 | Coutellier et al. . |
| 5,835,458 | * 11/1998 | Bischel et al. ..................... 369/44.12 |
| 5,961,848 | 10/1999 | Jacquet et al. . |
| 5,986,996 | * 11/1999 | Kitamura et al. ..................... 369/116 |
| 6,084,848 | * 7/2000 | Goto ..................................... 369/121 |

* cited by examiner

*Primary Examiner*—Ali Neyzari
(74) *Attorney, Agent, or Firm*—Oblon, Spivak, McClelland, Maier & Neustadt, P.C.

(57) ABSTRACT

An optical read/write device for an information medium which includes a transparent substrate having an approximately plane face carrying at least one pair of electrodes defining an airgap area whose size corresponds approximately to the size of the information item to be written or to be read. The pair of electrodes constitute a resonator for an incident electromagnetic wave having one component of its electric field parallel to the direction of alignment of the electrodes of the pair of electrodes. An optical source illuminates the electrodes with an optical beam, one component of the electric field of which is parallel to the direction of alignment of the pair of electrodes. Under these conditions, when excited by the beam F1, the electrodes will re-emit a beam which has a field concentration within the airgap. The re-emitted beam makes it possible to read/write information on an information medium placed near the electrodes.

24 Claims, 4 Drawing Sheets

DATA MEDIUM OPTICAL RECORDING/READING DEVICE

BACKGROUND OF THE INVENTION

1. Field of the Invention

The invention relates to an optical read/write device for an information medium. By way of example, this medium may be an optical medium or a magnetic or magnetooptic medium, such as a magnetic disk.

2. Discussion of the Background

FIG. 1b shows a conventional system for reading/writing on a magnetic medium. In such a system, a laser source S1 emits a light beam which is focused by lenses L1 and L2 onto the recording medium D1. This is a magnetooptic ferromagnetic material such as, for example, an alloy of rare earths (for example a terbium/iron alloy). This material has the property of acting on the polarization of the light which it receives depending on its magnetization. The light beam is reflected by the recording medium by possibly having its polarization modified by interaction with the magnetization of the information medium. The beam reflected by D1 is partly routed by the beam splitter SP1 to the beam splitter SP2. The splitter SP2 is a polarization splitter which routes one polarization to the photodetector PD and the other polarization to the other photodetector PP.

For recording, such a system records by localized heating using a beam, of sufficient energy level, transmitted by the source 1. Owing to the effect of a magnetic field B applied to the recording medium, the latter, as it cools, has its magnetization locally oriented in the direction of the applied magnetic field.

In such a system, the minimum size of a unit of information is diffraction limited. It is equal to approximately $\lambda/2$ (NA)

$\lambda$ being the wavelength of the light beam and

NA being the numerical aperture of the beam.

The size of the information item, and therefore the density of the information recorded, is limited by the wavelength of the beam. To reduce the size of the beam's spot on the information medium, it is possible in particular to make use of techniques of the type used in near-field optical microscopy.

The most conventional technique in near-field optical microscopy consists in the use of a stop of size smaller than the diffraction spot. If the stop is placed near enough to the object to be observed, the resolution obtained is essentially equal to the size of the stop. Near-field optical microscopes based on this principle have been described and produced by various teams (see the articles by D. W. Pohl et al., Applied Physics Letters 44, 652 (1984) and E. Betzig et al., Applied Physics Letters 51, 2088 (1987)).

Although this approach has allowed resolutions of the order of 50 nm to be demonstrated with illumination wavelengths of the order of 500 nm (resolution≈$\lambda$/10), it suffers from a fundamental difficulty, namely the very low level of optical signal that can be detected.

In practice, and so as to be able in particular to image surfaces which are not perfectly plane, the stop is physically produced at the end of an optical fibre or of a micropipette which is metallized and drawn so as to be thinned down at its end, as may be seen in FIG. 1a.

Such a probe for near-field microscopy, which may be regarded as a metallized electromagnetic waveguide of variable diameter, is generally brought up to and moved in the vicinity of the surface to be imaged using piezoelectric actuators, it being possible for various servocontrol signals to be generated so as to perform a scan at a constant height.

Three modes of operation are possible:

1) Operation in transmission mode

The waveguide is connected at the opposite end from the stop to a light source, generally a laser. That part of the light which is coupled into the waveguide propagates as far as the stop, where a small fraction is transmitted. If the surface of an at least partly transparent object is observed, a conventional optical system may collect the light transmitted through the object and direct it onto a photodetector. The signal thus photodetected while the surface is being scanned by the probe allows a point-by-point image to be reconstructed.

2) Operation in collection mode

This imaging mode consists in illuminating the imaged surface using a conventional optic operating by transmission through the object. The end of the probe is used for collecting the optical near field in the vicinity of the surface. The light thus coupled into the probe is then taken to a photodetector.

3) Operation in reflection mode

In this third and last mode, which may be seen as a combination of the two previous ones, the probe serves at the same time both to illuminate and to collect. An optical system, for example one having a semi-transparent component, allows that end of the probe on the opposite side from the stop to be connected simultaneously to a light source and to a photodetector. The variations in the power reflected by the end of the fibre are then exploited.

None of these three modes allows the acquisition of high-quality signals, for two reasons:

a) as may be seen in FIG. 1, the great reduction in diameter of the waveguide near its end defines an evanescent region, that is to say a region of the waveguide in which the optical wave is no longer propagated but is evanescent. The amplitude of an optical wave propagating towards the stop, or emanating therefrom, will therefore experience, on passing through this region, an attenuation by a factor of $e^{-d/\delta}$, where d is the length of the region and $\delta$ is a characteristic attenuation length depending on the detailed structure of the waveguide;

b) the transmission or collection efficiency of the stop, defined as the ratio of the collected or transmitted power to the product formed by multiplying the incident power density by the area of the stop, is proportional to $(a/\lambda)^4$ (Rayleigh's law for diffraction by objects which are small compared with $\lambda$), where a is the radius of the stop (by definition, small compared with $\lambda$) and $\lambda$ is the wavelength used.

Under the conditions that can be used in practice, these two conjugated factors result in the detection of optical powers, which have effectively interacted in the near field with the surface, of the order of 10 nW for illuminations of the order of a few tens of mW (the usable limit above which destruction of the probe is observed). For a degree of modulation of 5%, associated with local variations in properties of the surface observed, and at a wavelength of 500 nm, this results, assuming that the detector noise is negligible, in a signal-to-noise ratio of 78 dB in a 1 Hz bandwidth, which is reduced to 18 dB for a 1 MHz bandwidth. It may thus be seen that the acquisition of an image comprising 1,000×1,000 pixels cannot be envisaged in less than 1 second.

The use of such near-field microscopy probes, as an optical, and in particular magnetooptical, read device for a surface of an information medium therefore cannot be envisaged for high data-transfer rates ($\geq 10$ Mb/s) in read mode.

The very low powers available at the end of these probes also constitute an obstacle to the use of a write method based on local heating, as described above.

Moreover, the very structure of the probes described—optical fibres or pipettes drawn and then metallized—means that they have to be manufactured on an individual basis, something which poses reproducibility problems (as has been seen, the efficiency of the probe varies as the 4th power of the size).

SUMMARY OF THE INVENTION

The invention enables these problems to be solved.

The subject of the invention is therefore an optical read/write device for an information medium, characterized in that it comprises:

a transparent substrate having an approximately plane face carrying at least one pair of electrodes (E1-E2) defining an airgap area whose size corresponds approximately to the information item to be written or to be read, a pair of electrodes (E1-E2 or E3-E4) constituting a resonator for an incident electromagnetic wave having one component of its electric field parallel to the direction of alignment of the electrodes of the said pair of electrodes;

an optical source illuminating the said electrodes with an optical beam, one component of the electric field of which is parallel to the direction of alignment of the pair of electrodes.

BRIEF DESCRIPTION OF THE DRAWINGS

The various subjects and characteristics of the invention will appear more clearly in the description which follows and in the appended figures which represent.

DESCRIPTION OF THE PREFERRED EMBODIMENTS

Figure 1A:
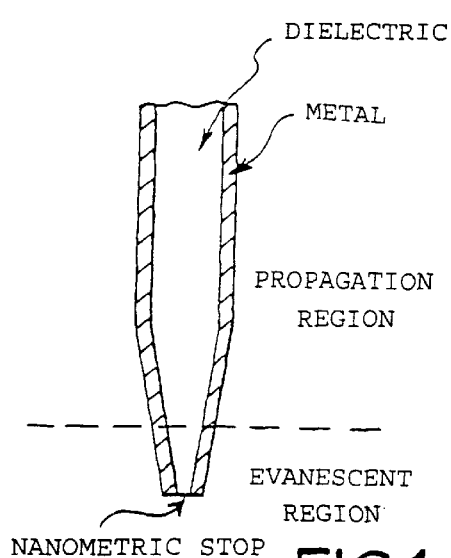
FIGS. 1a and 1b, systems known in the prior art.
Figure 1B:
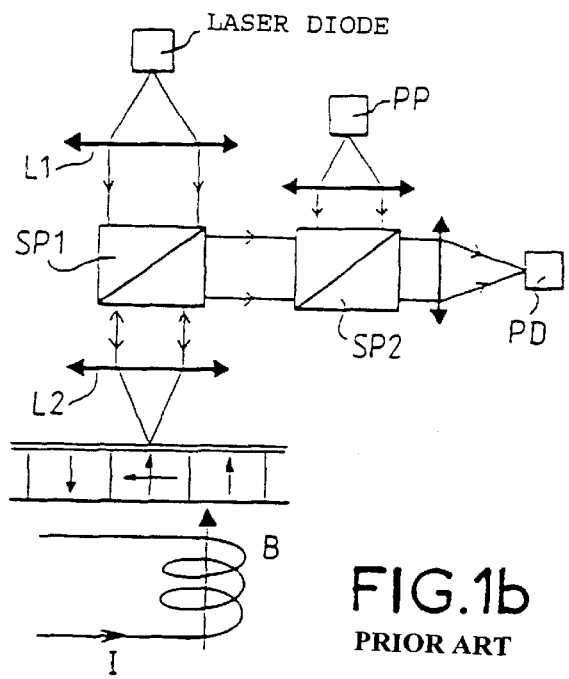
Figure 2A:
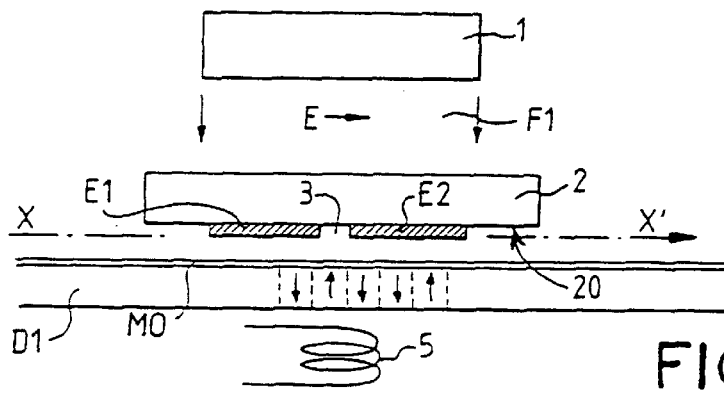
FIGS. 2a to 2c, a basic embodiment of the system of the invention.
Figure 2B:
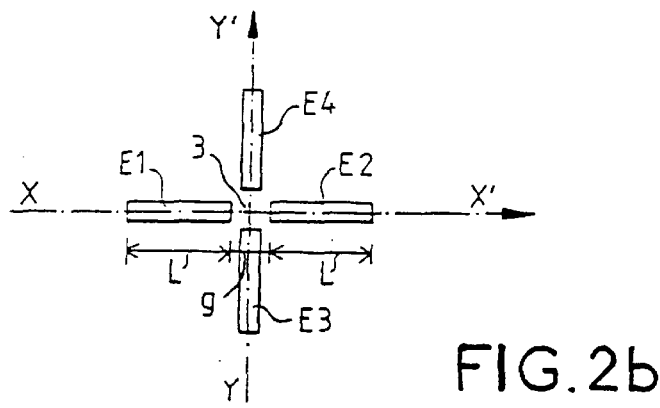
Figure 2C:
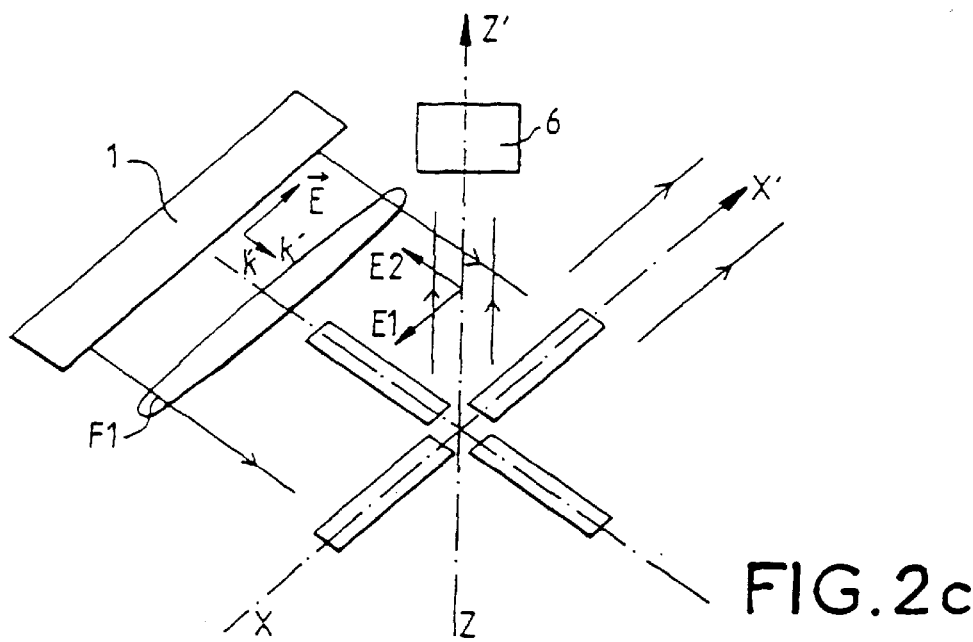

We will therefore describe an embodiment of the system of the invention with reference to FIGS. 2a to 2c.

This system comprises a substrate 2 carrying, on a face 20, at least two pairs of electrodes E1-E2 and E3-E4 arranged in a cross. The electrodes E1-E2 are aligned in the XX' direction and the electrodes E3-E4 aligned in the YY' direction. The electrodes of each pair are separated by a space called an airgap which, according to the example in FIG. 2b, is approximately the same length g for both pairs of electrodes, but it is not necessary for these two spaces to be equal. The width of an airgap may have a value of between a few nanometers and a few tens of nanometers.

These electrodes are illuminated with an optical beam F1 transmitted by a light source 1. The direction of one component of the electric field E of the light incident on the electrodes is parallel to the XX' direction.

In order to obtain resonance due to the effect of a wave of defined wavelength, the length of each electrode of an electrode pair depends on the wavelength of the beam F1. To obtain this resonance, the relationship between the length of an electrode and the wavelength of F1 depends on the nature of the material of the substrate and of the surrounding medium (refractive indices), on the material (refractive index) of which the electrodes are composed, and on the thickness and the width of the electrodes. In general, for a defined substrate, a surrounding medium which is air, electrodes made of a defined material and defined thicknesses and widths, the length of each electrode is approximately proportional to the wavelength.

Figure 7A:
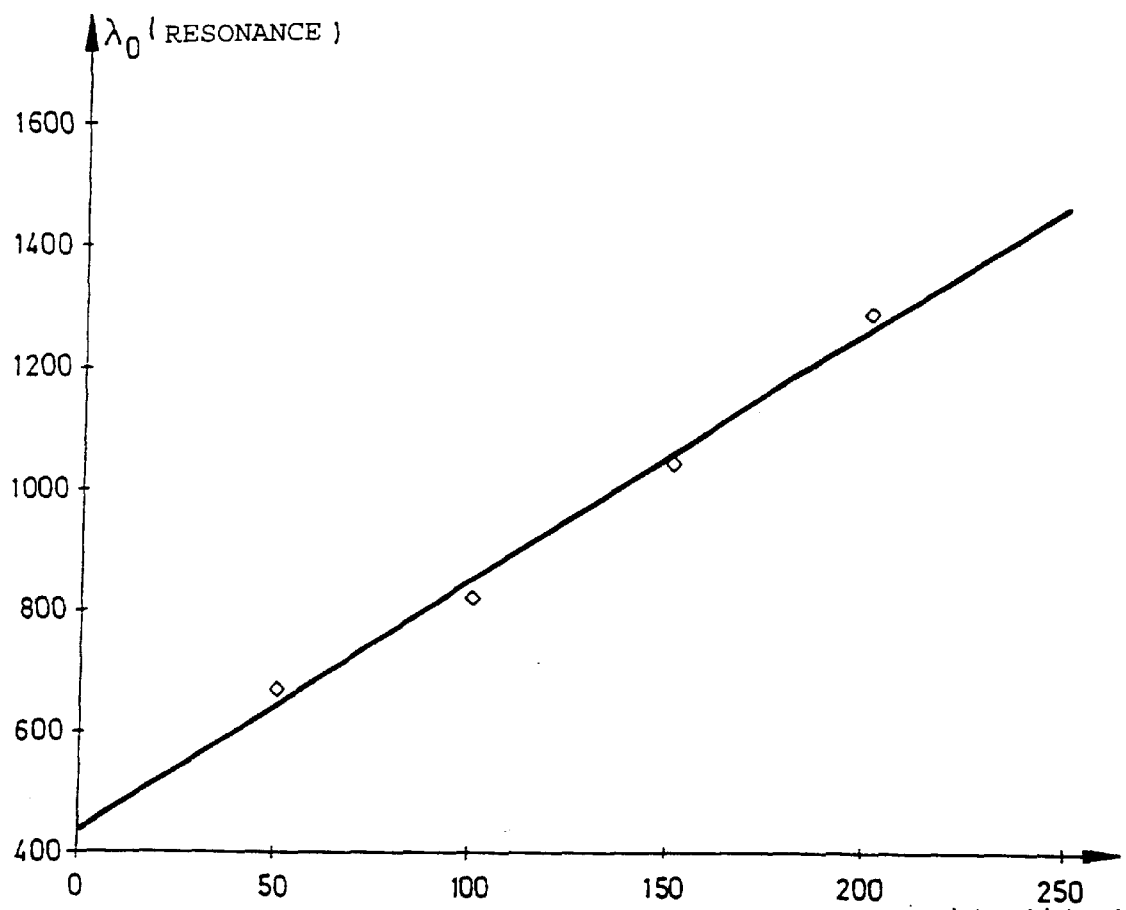
FIGS. 7a and 7b, an embodiment of the device of the invention.

FIG. 7a shows that, for gold electrodes, the wavelength allowing resonance to be obtained depends linearly on the length of the electrodes.

Figure 7B:
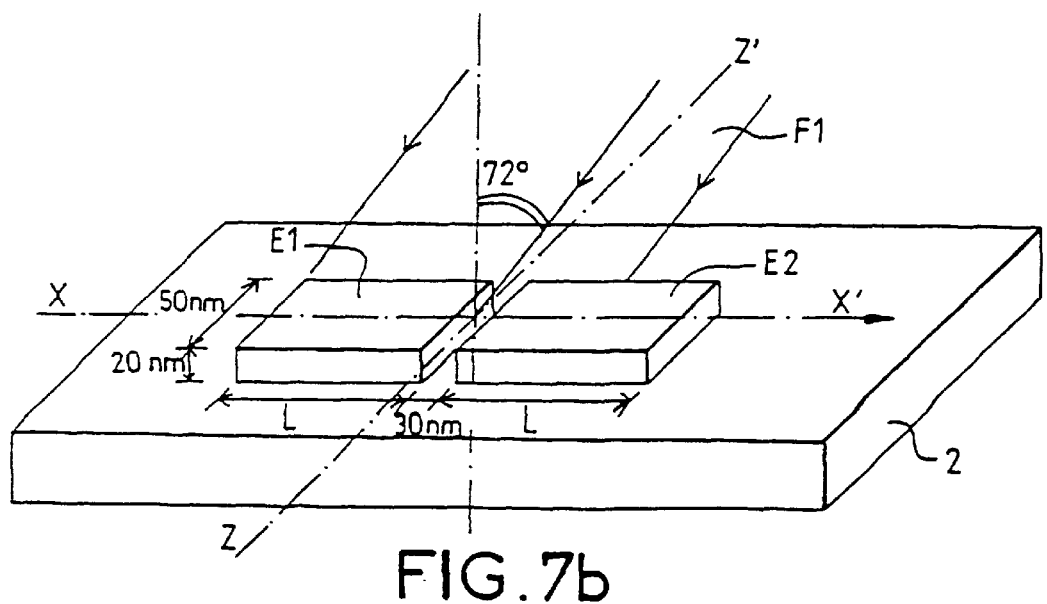

The curve in FIG. 7a was obtained using a device such as the one shown in FIG. 7b and having the following characteristics:

substrate index: n=2;

gold electrodes;

width of the electrodes: 50 nm;

thickness of the electrodes: 30 nm;

width g of the airgap: 30 nm;

inclination of the beam with respect to the plane of the electrodes: 72 degrees;

plane of incidence perpendicular to the direction of alignment of the electrode;

electric field parallel to the direction of alignment of the electrodes.

In addition, this system includes:

a magnetic-field induction device 5 shown symbolically by a coil in FIG. 2a and capable of inducing a magnetic field. This will be used during operation in the write mode for writing information onto the information medium;

a photodetection device 6 lying on the ZZ' axis, which is normal to the XX–YY' plane. This device is used when reading the information on the information medium. This device 6 may be replaced with a device for collecting the light and for sending it to a photodetection device offset with respect to the ZZ' axis.

As shown in FIG. 2c, the beam F1 illuminates the electrodes at an angle of incidence different from normal incidence. In this way, the specular reflection of the beam takes place in a direction other than the normal and is therefore not directed towards the photodetector 6.

Operation in read mode

An information medium D1 moves near the electrodes, parallel to the plane of the electrodes. This medium is a magnetooptic material or has a layer MO of magnetooptic material on its face which faces the electrodes, so that the orientation of the magnetization of the magnetooptic material has an influence on the polarization of the light that it receives.

Each pair of electrodes E1-E2 and E3-E4 may be regarded as an electromagnetic resonator which can be independently excited by an incident electromagnetic wave.

The resonator formed by the electrodes E1-E2 is excited by the beam F1, one component of the electric field of which is parallel to the XX' axis.

Owing to the effect of this excitation, the pair of electrodes E1, E2 re-emits an electromagnetic wave of polarization approximately parallel to the XX' axis.

The space lying between the electrodes E1 and E2 is the place where the electric field oriented along the XX' axis is concentrated.

When reading the medium D1, the electrode structure is located near the magnetooptic layer MO. The coupling of the electric field thus concentrated with the magnetization of the magnetooptic medium will create, in the medium, a polarization that oscillates at the exciting frequency. Locally, this polarization has a value:

$$\overline{P} = \chi_{MO} \overline{M} \hat{O} \overline{E} i$$

The induced dipole may be regarded as a source capable of exciting the second pair of electrodes E3-E4, which also operates as a resonator and gives rise to the emission of a wave whose polarization is approximately parallel to the YY' direction.

The two waves emitted by the two pairs of electrodes E1-E2 and E3-E4 are particularly intense in a direction ZZ' perpendicular to the plane of the electrodes. These two waves combine, giving rise to an elliptically polarized wave which is received by the photodetection device 6. The latter allows the polarization state of the light wave thus detracted to be analysed. The detected polarization state allows the orientation of the magnetization read on the information medium to be known.

The device of the invention therefore makes it possible to read an item of magnetic information whose size may be of the order of magnitude of the size of the airgap (about ten of few 10 nm).

Operation in write mode

For operation in write mode, assuming that the source 1 emits a beam F1 whose light is linearly polarized in a direction parallel to XX', only the pair of electrodes E1-E2 is used and, as previously, operates as a resonator concentrating the electric field in the airgap 3. A magnetic information medium placed near this airgap may be heated. Depending on the intensity of the beam F1 and on the amplification, it is possible by means of this heating to lower the coercivity of the magnetic material. Next, under the influence of a sufficient magnetic field generated by the induction device 5, the region of reduced coercivity, and just this region, has its magnetization reoriented.

As an illustrative example, the distance g (airgap) separating two electrodes of the same pair is approximately 10 nm. They may be made of gold, silver, copper, aluminium or an alloy of one of these materials.

Figure 3A:
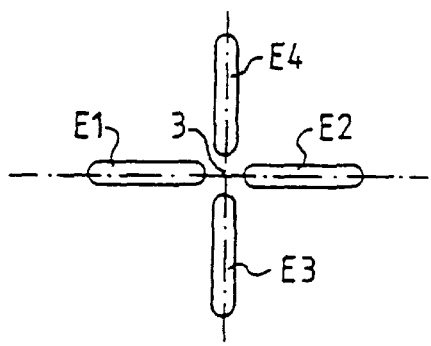
FIGS. 3a to 3d, various forms of electrodes of the device of the invention.
Figure 3B:
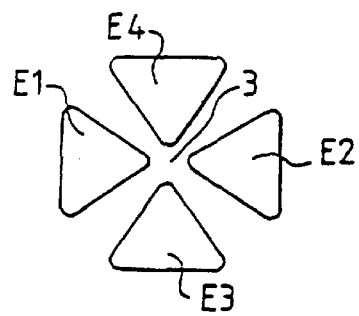
Figure 3C:
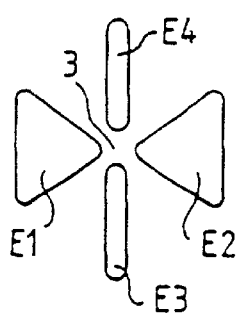

The electrodes may have various shapes, such as those shown in FIGS. 3a to 3c.

In FIG. 3a, the electrodes are of elongate shape with rounded ends.

In FIG. 3b, the electrodes are triangular and are of larger area, thereby enabling better coupling with the incident lightwave.

In FIG. 3c, the electrodes have shapes which are a combination of the electrodes of FIGS. 3a and 3b. The electrodes E1 and E2 are triangular and the electrodes E3 and E4 are elongate.

The electrode configurations in FIGS. 3a to 3c make it possible to read an information medium in which the information is recorded in the form of magnetizations perpendicular to the plane of the surface (as in FIG. 2a).

Figure 3D:
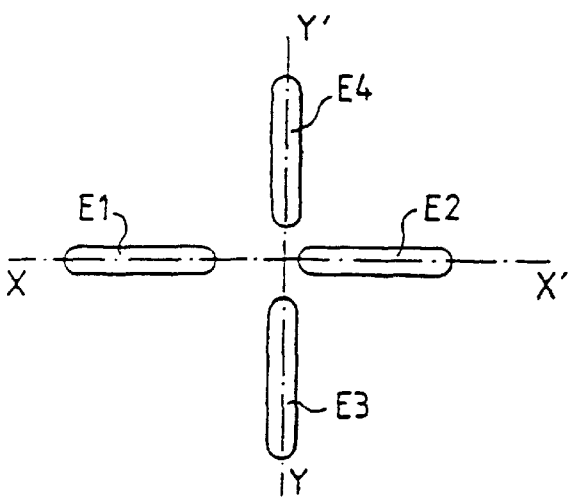
Figure 4:
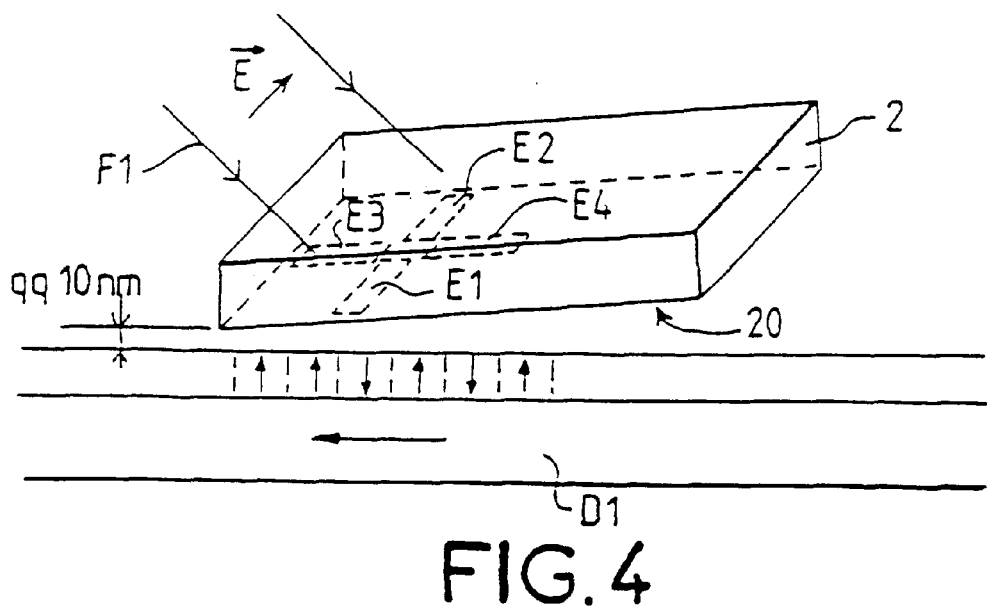
FIG. 4, one design of the read/write head according to the invention.

FIG. 3d shows a configuration making it possible to read information recorded in the form of magnetizations parallel to the plane of the medium. The direction YY' of the electrodes E3-E4 intersects the direction XX' of the electrodes E1-E2 in a region lying substantially towards one edge of the gap separating the electrodes E1 and E2.

As indicated above, the electrodes are produced on one face of a substrate which is preferably transparent to the optical wave emitted by the source 1. This substrate is made in the form of a shoe whose face bearing the electrodes faces the information medium. The shape of the shoe and its distance from the information medium are such that rapid movement of the information medium results in the creation of a thin air cushion between the substrate and the information medium and therefore results in the substrate 2 being hydrodynamically levitated above the information medium.

Figure 5:
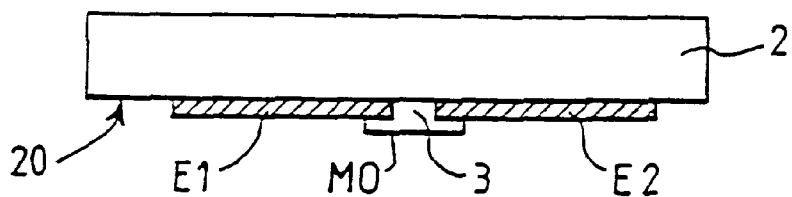
FIGS. 5 and 6, alternative embodiments of the read/write head according to the invention.

According to one embodiment of the invention, shown in FIG. 5, the electrodes E1 to E4 or at very least the air gap 3 is covered with a layer of a material MO2 having magnetooptic properties (a ferromagnetic material). Such a device makes it possible to read any type of magnetic information.

The above description was given in relation to the reading/writing of a magnetic or magnetooptic medium. However, the invention is applicable to other optically readable media. These are, for example, media in which the writing is achieved by ablating a recording layer, by a phase change in the recording medium or by a change in the chemical properties of a material (by the absorption of an electromagnetic wave), etc.

Operation in read mode

As in the previous case, the information medium moves close to the electrodes and parallel to the plane of the electrodes. The function of the read device is to detect the modifications in the properties (refractive index, for example) of the information medium D1.

To read in this way, the device requires only a single pair of electrodes E1-E2. As previously, this pair of electrodes may be regarded as an electromagnetic resonator which is excited by the incident electromagnetic wave (the beam F1), one component of the electric field of which is parallel to the XX' axis. Owing to the effect of this excitation, the pair of electrodes E1-E2 re-emits an electromagnetic wave of polarization approximately parallel to the XX' axis. When there is a local modification of the properties of the medium D1, a modulation of the electromagnetic wave re-emitted by the pair of electrodes is observed. This modulation is then detected by the photodetection device 6.

Operation in write mode

The writing function may be carried out by the heating of the information medium because of the concentration of the electric field, as was described previously. Writing may also be carried out because of an electromagnetic absorption process associated with the local field concentration in the airgap 3 (photochemical action on the medium).

Figure 6:
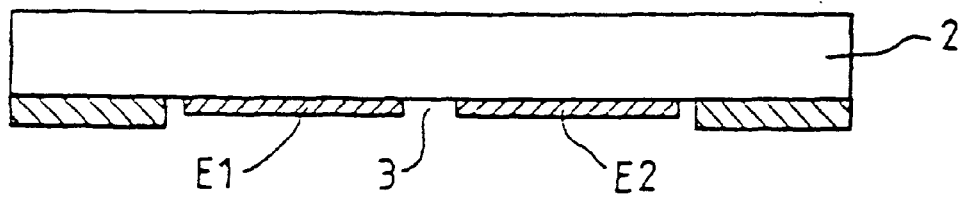

FIG. 6 shows a sectional view of a variation of the invention in which the surface 20 of the substrate not occupied by the electrodes is at least partly covered with a wear-resistant layer 21. The thickness of this layer is at least equal to the thickness of the electrodes. By way of example, this thickness may be from 10 to 20 nm.

What is claimed is:

1. Optical read/write device for an information medium, characterized in that it comprises:
    a transparent substrate having an approximately plane face carrying at least one pair of electrodes defining an airgap area whose size corresponds approximately to the size of the information item to be written or to be read, said pair of electrodes constituting a resonator for an incident electromagnetic wave having one component of its electric field parallel to the direction of alignment of the electrodes of said pair of electrodes;
    an optical source illuminating said electrodes with an optical beam, one component of the electric field of which is parallel to the direction of alignment of said pair of electrodes.

2. Device according to claim 1, characterized in that, for a device having a substrate of a defined refractive index and electrodes which are made of a defined material and have a defined thickness and width, the length of each electrode is approximately proportional to the wavelength of said electromagnetic wave so as to fulfil a resonance condition between the electrodes and the incident electromagnetic wave.

3. Device according to claim 2, characterized in that, with the electrodes being made of gold, the length of each electrode is proportional to said wavelength so as to fulfil a resonance condition between the electrodes and the incident electromagnetic wave.

4. Device according to claim 1, characterized in that the information medium is magnetic and that reading is accomplished by a magnetooptic effect.

5. Device according to claim 4, characterized in that it comprises:
- two orthogonal pairs of electrodes arranged in a cross and defining, at the intersection of the cross, an area whose dimensions correspond approximately to the dimensions of the information item to be written or to be read;
- a light-collection device placed approximately in a direction perpendicular to the plane of the electrodes at the point of intersection of the cross and transmitting the light to a photodetection device.

6. Device according to claim 1, characterized in that it includes a magnetic-field induction device placed near the information medium and said airgap area.

7. Device according to claim 6, characterized in that the magnetic-field induction device and the substrate carrying the electrodes are placed on either side of the information medium.

8. Device according to claim 1, characterized in that the distance between two electrodes of the same pair of electrodes is about ten or a few tens of nanometers.

9. Device according to claim 1, characterized in that the electrodes of the same pair are symmetrical with respect to the centre of said airgap area.

10. Device according to claim 4, characterized in that a first pair of electrodes is aligned in a first direction parallel to one component of the electric field of the electromagnetic wave and in that a second pair of electrodes is aligned in a second direction, which intersects the first direction substantially towards one edge of the airgap defined by the first electrode pair.

11. Device according to claim 1, characterized in that each electrode has an elongate shape.

12. Device according to claim 1, characterized in that each electrode has an approximately triangular shape and has one vertex of the triangle facing said airgap area.

13. Device according to claim 4, characterized in that the electrodes of the first pair of electrodes have a triangular shape and the electrodes of the second pair of electrodes have an elongate shape.

14. Device according to claim 10, characterized in that the ends of the electrodes facing the airgap area are rounded.

15. Device according to claim 1, characterized in that the direction of said light beam is not perpendicular to the plane of the electrodes.

16. Device according to claim 4, characterized in that at least that part of the airgap which lies between the electrodes is covered with a layer of a material having magnetooptic effects.

17. Device according to claim 4, characterized in that the photodetection device includes a polarization analyser.

18. Device according to claim 1, characterized in that the face of the substrate carrying the electrodes has a shape such that movement of an information medium with respect to these electrodes has the effect of creating an air cushion between the face of the substrate and the information medium.

19. Device according to claim 17, characterized in that said face of said substrate is inclined with respect to the plane of the information medium.

20. Device according to claim 1, characterized in that at least part of that surface of the substrate which is not occupied by the electrodes includes a layer of a wear-resistant material having a thickness at least equal to the thickness of the electrodes.

21. Use of the device according to claim 9, characterized in that it is intended for reading/writing the information on an information medium in which the information is stored in the form of regions magnetized perpendicular to the plane of the medium, the magnetized regions of the information medium being located near the read/write device.

22. Use of the device according to claim 10, characterized in that it is intended for reading/writing information on an information medium in which the information is stored in the form of regions magnetized parallel to the plane of the medium, the magnetized regions of the information medium being located near the read/write device.

23. Use of the device according to claim 4, characterized in that it is intended for reading/writing information on an information medium which includes a layer of a material exhibiting magnetooptic effects, said information medium being located near the read/write device.

24. Use of the device according to claim 1, characterized in that it is intended for reading/writing information on optical information media, said medium being located near the read/write device.

* * * * *